US012704393B2

(12) United States Patent
Mesnard

(10) Patent No.: US 12,704,393 B2
(45) Date of Patent: Aug. 11, 2026

(54) FLOWMETER WITH CONDITIONING ORIFICE PLATE

(71) Applicant: Rosemount Inc., Shakopee, MN (US)

(72) Inventor: David R. Mesnard, Boulder, CO (US)

(73) Assignee: ROSEMOUNT INC., Shakopee, MN (US)

( * ) Notice: Subject to any disclaimer, the term of this patent is extended or adjusted under 35 U.S.C. 154(b) by 321 days.

(21) Appl. No.: 18/598,232

(22) Filed: Mar. 7, 2024

(65) Prior Publication Data

US 2025/0283742 A1 Sep. 11, 2025

(51) Int. Cl.

| | |
|---|---|
| ***G01F 1/42*** | (2006.01) |
| ***F15D 1/02*** | (2006.01) |
| ***G01F 1/36*** | (2006.01) |
| ***G01F 1/50*** | (2006.01) |

(52) U.S. Cl.

CPC ............... *G01F 1/42* (2013.01); *F15D 1/025* (2013.01); *G01F 1/363* (2013.01); *G01F 1/50* (2013.01)

(58) Field of Classification Search

CPC ..... G01F 1/42; G01F 1/36; G01F 1/40; G01F 1/50; G01F 25/10; F15D 1/025

See application file for complete search history.

(56) References Cited

U.S. PATENT DOCUMENTS

| | | | | |
|---|---|---|---|---|
| 3,733,898 A | | 5/1973 | Yamamoto et al. | |
| 5,495,872 A | * | 3/1996 | Gallagher ............... | F15D 1/025 138/40 |
| 5,596,152 A | | 1/1997 | Bergervoet et al. | |
| 7,284,450 B2 | | 10/2007 | Orleskie et al. | |
| 9,476,744 B2 | * | 10/2016 | Hering ...................... | G01F 1/42 |

(Continued)

OTHER PUBLICATIONS

Notification of Transmittal of the International Search Report and the Written Opinion of the International Searching Authority, or the Declaration from PCT/US2025/018070, dated Jun. 24, 2025.

(Continued)

*Primary Examiner* — Herbert K Roberts
(74) *Attorney, Agent, or Firm* — Westman, Champlin & Koehler, P.A.

(57) ABSTRACT

A differential pressure fluid flow meter measures flow of a fluid based upon a differential pressure. An orifice plate is selected from a plurality of orifice plates configured to be positioned between upstream and the downstream taps in the conduit. Four evenly spaced circular orifices allow the flow of fluid there through and create the differential pressure which is a function of fluid flow rate. $X_{dc}$ is a distance in a direction perpendicular to an axis of the conduit from the nearest outer circumference of the circular orifices to a projection of a center of the downstream tap on the flat orifice plate. $X_{ed}$ is a distance between outer circumferences of two opposed circular orifices. $R_b$ is a ratio of the diameter that locates the centers of the four circular orifices and the interior diameter of the conduit. $X_{dc}$ and $X_{ed}$ are each a function of $R_b$.

16 Claims, 9 Drawing Sheets

$$R_b = D_f / D$$

$$X_{ed} = D\left(R_b - \beta/2\right) \quad X_{dc} = \frac{D}{2}\left(\sqrt{1 - \sqrt{2}R_b + R_b^2} - \beta/2\right)$$

(56) References Cited

U.S. PATENT DOCUMENTS

2003/0188586 A1* 10/2003 Orleskie .................. G01F 1/42
73/861.61
2005/0284236 A1 12/2005 Kielb et al.
2010/0011869 A1* 1/2010 Klosinski ................. G01F 1/72
340/626
2016/0290840 A1* 10/2016 Stehle ...................... G01F 1/42

OTHER PUBLICATIONS

"A General Structural Design Methodology for Multi-Hole Orifices and its Experimental Application", by T. Zhao et al., Journal of Mechanical Science and Technology 25 (9) (2011), pp. 2237-2246.

"The Effects of Flow Conditioners and Tap Location on Orifice Flowmeter Performance", by J. Scott et al., United States Department of Commerce, National Institute of Standards and Technology, Oct. 1991, 76 pgs.

"Evaluations of Multi-Holed Orifice Flowmeter Under Developming Flow Conditions—An Experimental Study", by A. Raheem et al, Flow Measurement and Intrumentation 79 (2021),, 16 pgs.

"Throttling Characteristics of Multi-Hole Orifice in Multi Stage Assembly", Journal of Research in Science, Technology, Engineering and Management, by K. Kaleemulla et al., ISNN: 2456-0197, 13 pgs.

"Parametic Analysis of Orifice Plates on Measurement of Flow: A Reveiw", by S. Vemulapalli et al., Ain Shams Engineering Journal (2022), 23 pgs.

"The Orifice Plate Discharge Coefficient Equation—The Equation for ISO 5167-1", by M J Reader-Harris et al., National Engineering Laboratory, East Kilbride, Glasgow, May 3, 1991.

* cited by examiner

Orifice Plate Geometry

Conditioning Orifice Plate, COP

Viewed from Downstream Face $$\beta = \frac{d}{D}$$

$$\beta = \frac{2d_c}{D} \quad R_b = \frac{D_f}{D}$$

Cross-section of bore-edge
D = Pipe Inside Diameter $$0.005D \leq e < 0.02D$$

$$e \leq E < 0.05D$$

$$r(G) \leq 0.0004D$$

$$\alpha = 45 \pm 15°$$

$$R_b = D_f / D$$

$$X_{ed} = D\left(R_b - \beta/2\right) \quad X_{dc} = \frac{D}{2}\left(\sqrt{1 - \sqrt{2}R_b + R_b^{\,2}} - \beta/2\right)$$

FLOWMETER WITH CONDITIONING ORIFICE PLATE

BACKGROUND

The present invention relates generally to a process flow device that includes a self-averaging (or conditioning) orifice plate type of primary flow element for measuring, by a differential pressure, the volumetric rate of fluid flowing a fluid carrying conduit where the velocity profile of the fluid is asymmetric with respect to the longitudinal axis of the conduit.

Orifice plate flow meters having a single centered opening in a plate constriction that is disposed diametrically within a fluid carrying pipe, with differential pressure measurement device on the upstream and downstream sides of the constriction, are known in the art. The orifice plate is referred to as the "primary element" and the device used to measure the resultant differential pressure is referred to as the "secondary element." These types of orifice plates are referred to as single-bore orifice plates or SOPs. While the accuracy of such devices is good for long straight runs of pipe, orifice plate flow meters suffer the disadvantage of reduced accuracy when placed in short pipe runs that follow a flow disturbance created by upstream apparatus, such as an elbow, expander, reducer, valve or other discontinuity. For measurement accuracy with an orifice plate flow meter, a long straight run of pipe (in excess of ten pipe diameters in some instances) upstream of the flow meter is required in order to present a fully developed symmetrical velocity profile to the orifice plate, with the highest fluid velocity occurring coaxially with the center of the orifice plate constriction. When an upstream pipe fitting or other device skews the velocity profile, the pressures measured at the orifice flow meter pressure taps is affected, which results in an inaccurate flow rate measurement.

To reduce the asymmetry of the velocity profile created by an upstream fitting, the commonly used apparatus is a flow straightener, of the type disclosed in U.S. Pat. No. 5,596,152 or apparatus similar to the flow conditioner described in U.S. Pat. No. 3,733,898. However, a more compact design uses a conditioning orifice plate (COP) which is an orifice plate having a plurality of circular openings in a configuration pioneered by Dieterich Standard, Inc., as shown in U.S. Pat. No. 7,284,450, issued Oct. 23, 2007, entitled AVERAGING ORIFICE PRIMARY FLOW ELEMENT, which is incorporated herein by reference in its entirety.

The COP design configuration offers significantly improved accuracy over short pipe runs in comparison to SOP configurations. However, each COP design configuration must be characterized for each different pipe schedule to determine a calibration factor. The characterization process requires extensive laboratory analysis and can limit the application of COPs in specific process configurations.

Other and further objects, features advantages of the invention will become apparent from the following description of embodiments of the invention, taken in conjunction with the accompanying drawings.

SUMMARY

A differential pressure fluid flow meter is provided for measuring flow of a fluid through a conduit based upon a differential pressure in the fluid generated by the flow of fluid through an orifice plate element disposed between the connecting flanges of conduit sections of a fluid carrying conduit. The meter includes a differential pressure sensor arranged to sense a differential pressure between an upstream tap and a downstream tap in the conduit, wherein the conduit is selected from a plurality of conduits each having a different interior circumference configured to carry the flow of fluid there through. A flat orifice plate is selected from a plurality of flat orifice plates each configured to be positioned between the upstream and the downstream taps in the conduit; where each of the plurality of orifice plates is sized to couple to one of the plurality of conduits having different interior circumferences. The plurality of flat orifice plates is configured to be sealed between flanges of the conduit along the interior circumference of the conduit which defines a circular active region of the plurality of flat orifice plates. Four evenly spaced circular orifices are provided in each of the active regions of the plurality of flat orifice plates. The four evenly spaced circular orifices is the reconfigured to allow the flow of fluid there through and create the differential pressure which is a function of fluid flow rate, $X_{dc}$ is a distance in a direction perpendicular to an axis of the conduit from the nearest outer circumference of the circular orifices to a projection of a center of the downstream tap on the flat orifice plate. $X_{ed}$ is a distance between outer circumferences of two opposed circular orifices. $R_b$ is a ratio of the diameter that locates the centers of the four circular orifices and the interior diameter of the conduit. $X_{dc}$ and $X_{ed}$ are each a function of $R_b$ for each of the plurality of flat orifice plates. Measurement circuitry determines flow rate of the fluid based upon the sensed differential pressure and a discharge coefficient of flat orifice plat selected from the plurality of flat orifice plates.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
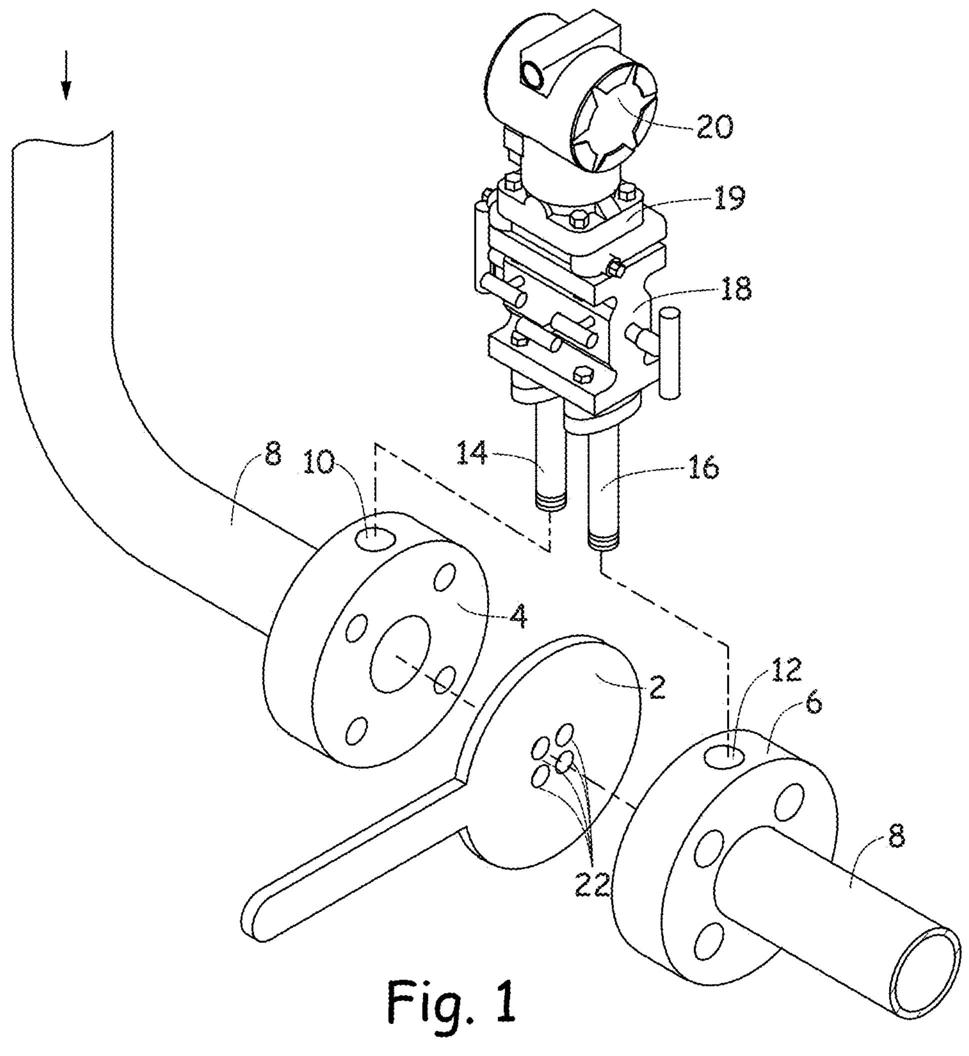
FIG. 1 is a perspective exploded view of an averaging orifice primary flow element of the present invention positioned between two opposing mounting flanges fixed to the ends of a fluid carrying conduit. Dashed lines indicate the connection of accessory flow processing devices with the upstream and downstream pressure ports disposed within the mounting flanges.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

A fluid flow meter configuration is provided in which a conditioning orifice plate (COP) is placed in a flow of process fluid. This provides an obstruction in the fluid flow which results in a differential pressure being generated across the orifice plate. The configuration of the conditioning orifice plate helps to improve the accuracy of differential pressure-based flow measurements in situations where the fluid flows in an irregular pattern. A differential pressure transmitter is used to sense this differential pressure, which can be used to determine flow rate of the fluid based upon Bernoulli's equation and as a function of a discharge coefficient (C). The discharge coefficient is related to pipe diameter, the bore size in the orifice plate and location of the connections ("taps") to the pipe used to measure the upstream and downstream pressures. The ratio of the bore size to the pipe diameter is referred to as beta (β). A large β value is desirable because it provides less restriction to flow fluid. However, a smaller β value produces a larger differential pressure and can improve measurement accuracy. When determining the discharge coefficient for a conditioning orifice plate, extensive empirical measurements have been needed to determine a calibration factor (Fc) for each particular pipe size, bore configuration, beta value and tap location in order to accurately measure flow rate, where: Fc=C/C(Ref), C(Ref) being the reference value for C determined by the SOP discharge coefficient equation. This calibration process is time consuming, expensive, and limits the number of orifice plate configurations that can be offered in practice.

In various aspects, the present invention provides a conditioning orifice plate (COP) primary element for use with a differential pressure sensing secondary element having a configuration which is consistent across differing pipe sizes. The configuration allows the orifice plates to be used with different pipe sizes, beta values and tap locations, without the need to empirically determine a correction factor Fc for the discharge coefficient for the numerous different combinations.

Figure 1A:
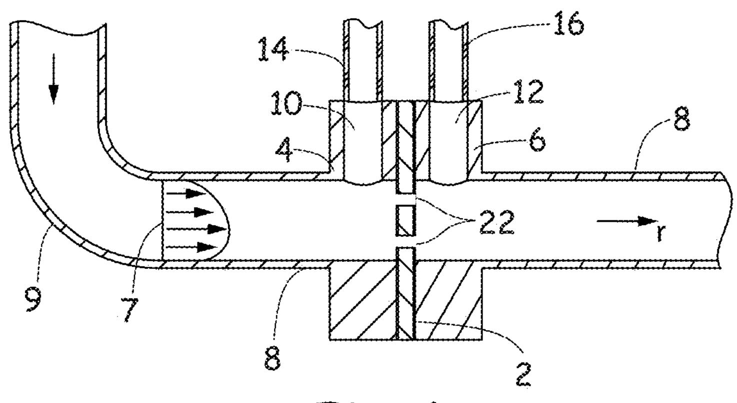
FIG. 1A is a fragmentary cross-sectional view of the piping and primary flow element of FIG. 1, illustrating a representative velocity profile of the fluid in the pipe that would exist shortly downstream of an elbow in the piping.

A simplified version of an embodiment of the present invention is shown in FIGS. 1 and 1A. A conditioning orifice plate primary flow element 2 is positioned between two opposing mounting flanges 4 and 6 fixed to the ends of a fluid-carrying conduit 8 downstream of an elbow 9 where the velocity profile 7 is skewed. Each of the mounting flanges contain a radially extending pressure sensing port (tap) 10 and 12 that communicate with the fluid flowing in the pipe and are respectively connected through conduits 14 and 16 to a valve manifold 18 and into a pressure transducer 19. A line between ports 10,12 defines a center tap line. An electrical signal that represents the sensed differential pressure between the ports 10 and 12 is transmitted by transmitter 20 to a processing unit (not shown).

The primary flow element 2 comprises a circular plate having four apertures 22 symmetrically arranged around the center of the plate 2. The center of the conditioning orifice plate 2 is positioned coaxially with the longitudinal centerline of the pipe 8. The plate 2 is retained in place by the sandwiching pressure of flanges 4 and 6, and the active region of the plate 2 is defined by the inner diameter of the conduit 8. The circumferential edges of the apertures 22 on the downstream side of the flow element plate 2 are preferably, but not necessarily, chamfered in order to facilitate expansion of the fluid column that flows through each aperture.

As shown in FIG. 1A, the velocity of the fluid approaching the upper pair of apertures 22 in the constricting plate 2 is less than the velocity of the fluid approaching the lower pair of apertures 22. These initial differences in fluid velocity will not only influence the static pressure sensed by the pressure port 10 on the upstream side of the plate 2, they will also impact the velocity of the fluid that passes through the respective pairs of apertures and accordingly, will affect the static fluid pressure sensed by the downstream port 12. Because the velocity of fluid through each of the apertures, or each pair of apertures, will be different, the static pressure on the downstream side of the plate 2 that is a function of the fluid velocity through each of the apertures will be averaged within the fluid and the downstream pressure port 12 will sense that averaged static pressure. With a plurality of apertures positioned around the center of the plate 2, the static pressure will be averaged, even when the fluid profile is not symmetrical about two pipe axes, as it would be when the fluid is swirling or otherwise irregular.

Figure 2:
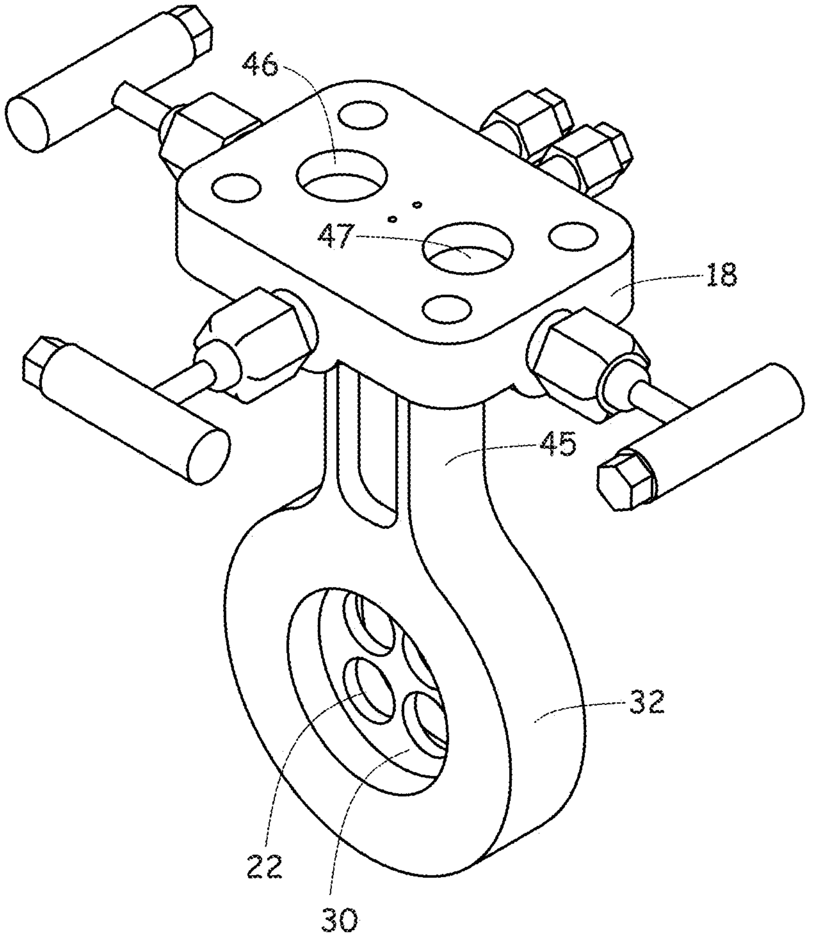
FIG. 2 is a perspective view of the embodiment of the present invention wherein the averaging orifice primary flow element is integrally incorporated intermediate the ends of an annular mounting ring with a projecting pressure communicating stem that mounts a valve-carrying manifold.
Figure 3:
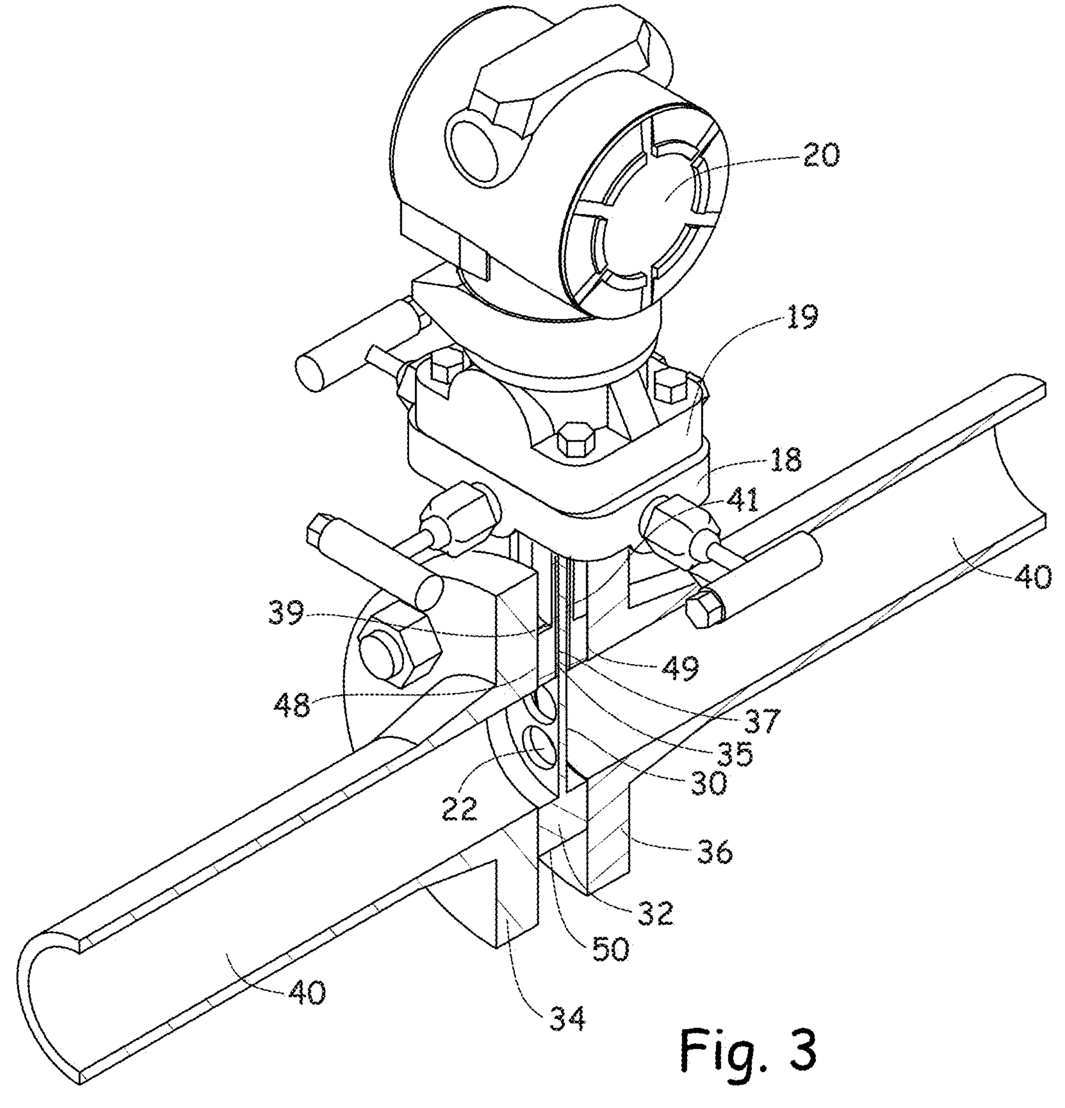
FIG. 3 is a fragmentary perspective view of the FIG. 2 embodiment of the present invention, as supported between opposing mounting flanges on the ends of a fluid carrying conduit.
Figure 4:
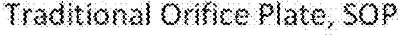
FIG. 4 illustrates plan views of a traditional orifice plate and a conditioning orifice plate.
Figure 4:
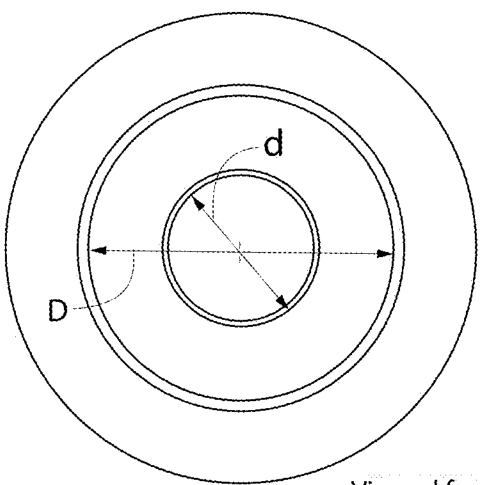
Figure 4:
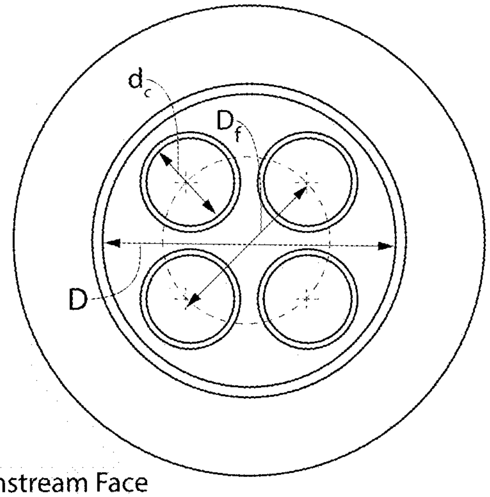

A modified form of a four-aperture conditioning orifice primary flow element plate 30 is shown in FIG. 2, integrally formed with the annular ring, or wafer, 32 that is insertable between the flanges 34 and 36 attached to the ends of two sections of a fluid-carrying pipe 40. Upstream and downstream pressure sensing ports 35 and 37 are located on each side of the flow element plate 30, as seen in FIG. 3. The pressure sensing ports 35 and 37 connect through conduits 39 and 41 in the stem 45 to conduits 46 and 47 in the manifold 18. The FIG. 2 embodiment is also illustrated in FIGS. 3 and 4, illustrating the total flow meter assembly inserted between pipe sections that carry the fluid whose flow rate is to be measured.

The wafer 32 is an annular ring whose inside diameter corresponds to the inside diameter of the fluid-carrying pipe 40. The flow element plate 30 is positioned across the ring opening substantially equi-distant from each of the lateral sides of the wafer ring 32. The wafer is mounted between two gaskets 48 and 49 that interface with the pipe end flanges 34 and 36. A semi-circular positioning ring 50 functions to position and secure the wafer 32 in its proper place between the pipe flanges. Positioning of the wafer 32 is achieved by placing it into the cradle formed by the interior of the ring 50 and seating the shanks of the fastening bolts 55 into the outer grooves of the ring.

With the conditioning orifice plate 30 being integrally constructed with the mounting ring wafer 32 and the conduit carrying stem 45 and with the transmitter mounting manifold 18 being directly attached to the stem 45, several important advantages are achieved. The differential pressure generating mechanism, the pressure sensing ports, the manifold and the transmitter components are incorporated into a single unit that is easily insertable between the flanges of pipe sections.

The conditioning orifice plate (COP) was developed to eliminate the most limiting design requirement of the single-bore orifice plate (SOP): the long straight-run of piping required to reduce turbulence in the flow and provide the needed performance. The baseline performance of the conditioning orifice plate was sufficiently similar to the single-bore orifice plate that the operating equation that generates the single-bore orifice plate or SOP discharge coefficient equation, was used to configure the device to calculate flow rate. However, conditioning orifice plates still require calibration before installation. In order to provide orifice plates that did not require such calibration, a data analysis was performed to predict the value of a calibration factor (Fc) used to adjust the discharge coefficient for the standard plate configurations and pipe sizes (schedules). This allows the use of a custom equation to provide an uncalibrated option for the conditioning orifice plate, thereby eliminating the need to perform empirical calibration measurements for each design configuration. Unfortunately, this option cannot be used with non-standard pipe schedule configurations due to the non-similar configuration of the plate and a lack of data to support the configuration. However, as set forth herein, a new orifice plate configuration is provided which allows the replacement of the SOP equation with one unique to the conditioning orifice plate. This eliminates the need for determining a separate calibration factor (Fc) equation. This configuration provides an independent discharge coefficient equation for the conditioning orifice plate.

When selecting an orifice plate, there are a number of design parameters that can be considered. These parameters can alter the discharge coefficient for the plate. One parameter is the size of the orifice relative to the inside diameter of the conduit. This ratio is referred to as the β ratio. A large orifice is desirable because it provides less obstruction to flow. However, a smaller orifice creates a greater differential pressure for a given flow rate, providing increased accuracy. FIG. 4 illustrates the β ratio for a single bore orifice plate and a 4-bore conditioning orifice plate.

Figure 5:
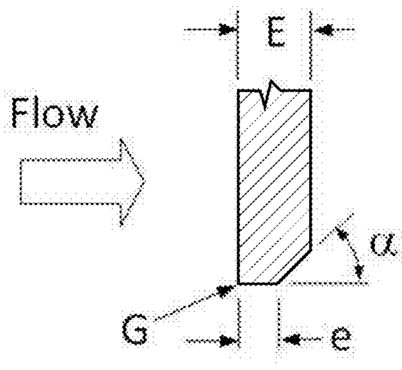
FIG. 5 is a cross-sectional view of a bore edge of an orifice plate showing a downstream taper.

The chamfer of the downstream side of the bore facilitates expansion of the fluid as it exits the bore. This is illustrated in FIG. 5 and also has an impact on the discharge coefficient.

The pipe inner diameter also alters the discharge coefficient and impacts the positioning of the bores in the orifice plate in the configuration set forth herein. Pipe schedule relates to the thickness of a wall of the pipe, and the orifice plate must be configured accordingly. Further still, the locations and configurations of the upstream and downstream pressure taps will affect the relationship between differential pressure and flowrate.

Figure 8A:
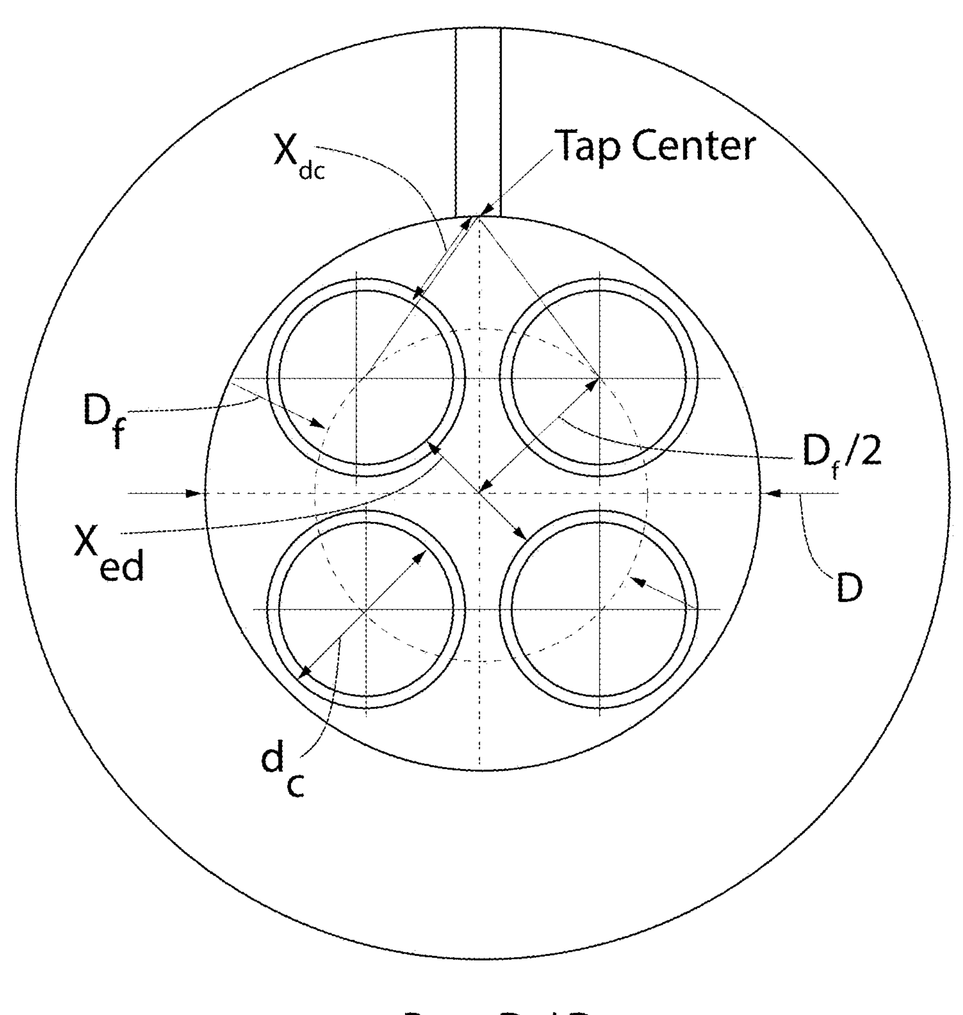
FIG. 8A is a front plan view of a conditioning orifice plate including four evenly spaced bores having a geometry in accordance with the present invention.
Figure 8B:
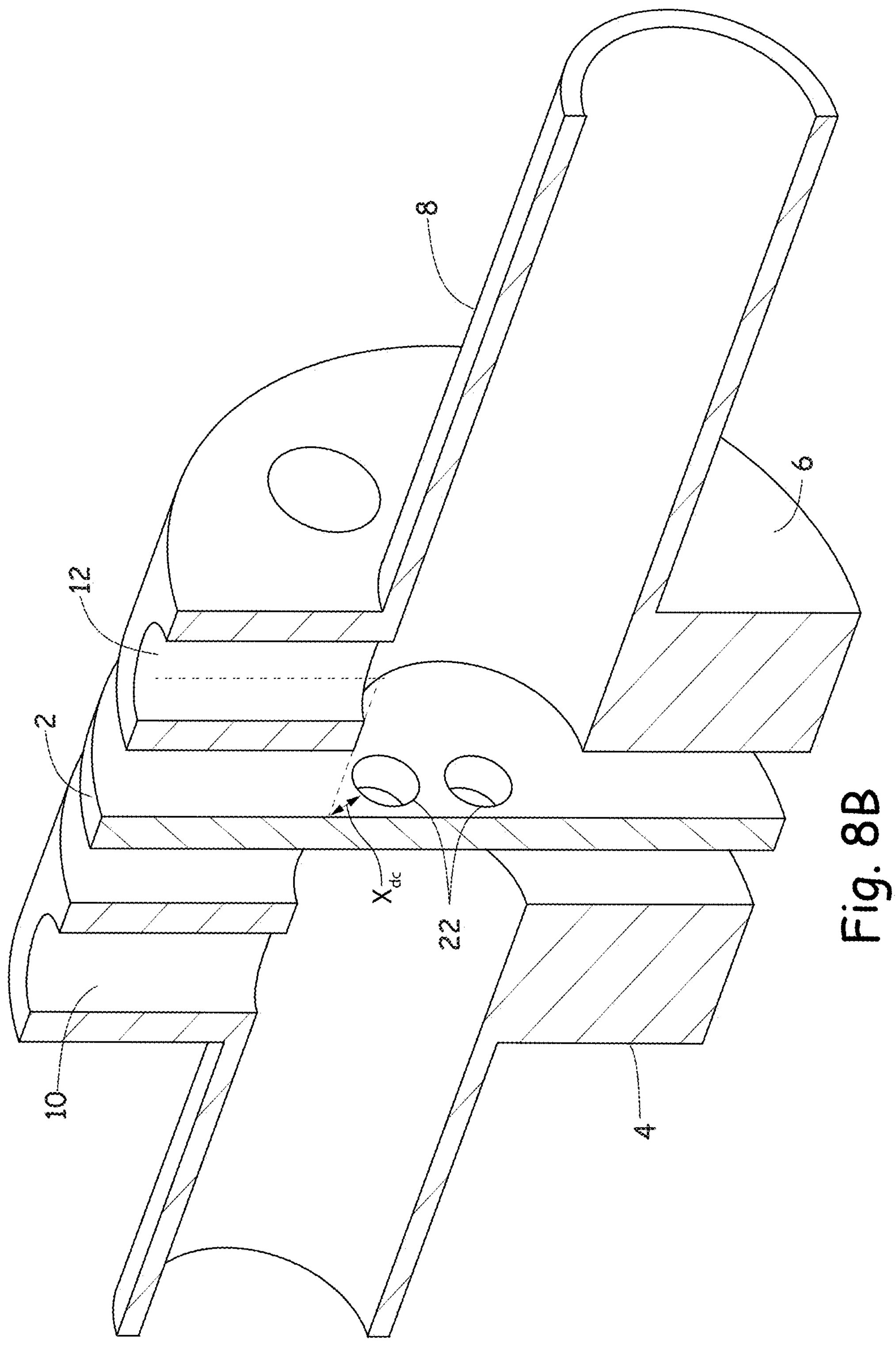
FIG. 8B is a cross-sectional perspective view of a pipe and orifice plate which illustrates dimension $X_{dc}$.

FIG. 8A is a plan view of a new 4 bore orifice plate design configuration and illustrates a number of parameters. $R_b$ is the ratio of the diameter of the circle that the center of the four orifice bores are located on ($D_f$) and the inside diameter of the pipe (conduit) (D), i.e., the distance between centers of two opposed circular orifice bores ($D_f$) and the interior diameter of the conduit D. $X_{dc}$ is shown in FIG. 8B and is the distance between the nearest circumference(s) of the orifice bores and a projection of the center of the downstream pressure tap 12 onto the plane of the orifice plate 2. In other words, $X_{dc}$ is a distance perpendicular to the plane of the orifice plate 2 from the center of the downstream pressure tap 12 to the nearest circumference(s) of the orifice bores. $X_{ed}$ is a distance between outer circumferences of two opposed circular orifices. In one specific implementation of the orifice plate configuration of the invention, these parameters are related in accordance with the equations shown in FIG. 8A. Specifically:

$$R_b = \frac{D_f}{D}$$

$$X_{ed} = D\left(R_b - \frac{\beta}{2}\right) X_{dc} = \frac{D}{2}\left(\sqrt{1 - \sqrt{2}R_b + R_b^2} - \frac{\beta}{2}\right)$$

An independent discharge coefficient equation is provided for the new conditioning orifice plate geometry. The unique design parameters for the conditioning orifice plate have been derived and shown to predict the discharge coefficient for the range of pipe sizes and beta values when used in the new equation for various device configurations. This new configuration of the conditioning orifice plate and the new discharge coefficient equation will:

1. Allow prediction of the discharge coefficient for all configurations that are fabricated to the new design to provide a conditioning orifice plate that does not require empirical laboratory calibration. This eliminates expensive, and time intensive, calibrations on many devices that use non-standard configurations including non-standard pipe schedules.

2. Provide consistent design values for the bore locations in the orifice plate for any pipe size using a unique equation that is continuous over the entire pipe size range (see FIG. 9, discussed below in more detail). The original bore locations are preserved in this equation and thereby allow the legacy data set to be included in new device performance calculations.

3. The new orifice plate configuration provides the proper clearance to allow any offered beta ratio for any pipe schedule. Typically, in existing plate configurations, the bore (orifice) locations are set based upon a standard pipe schedule. This limits the higher beta ratio values from being included in the plates offered for higher-schedule pipes.

Figure 6:
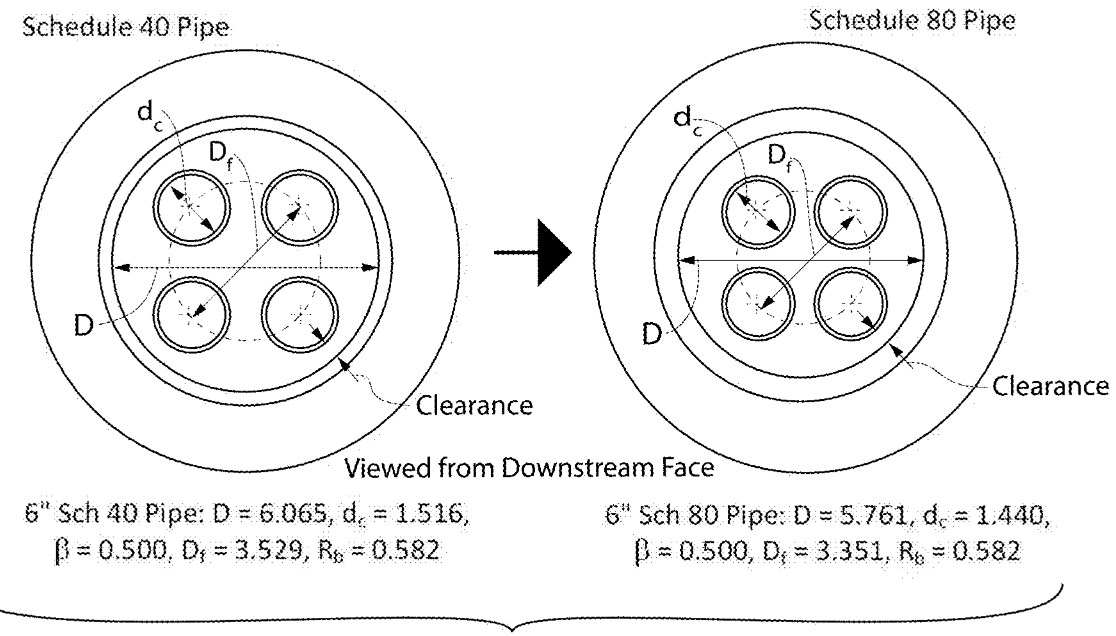
FIGS. 6 and 7 illustrate beta values for orifice plates when used with different pipe schedules.
Figure 7:
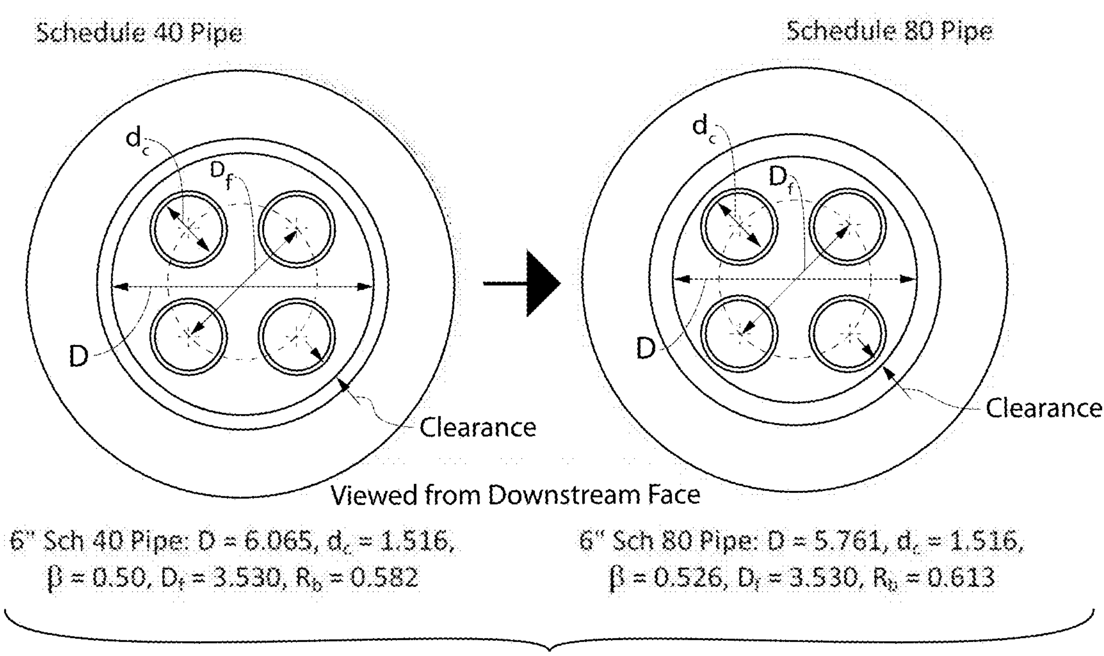

4. The balance of the traditional plate and bore-edge design parameters are retained for the conditioning orifice plate, as shown in FIG. 5. The difference between the traditional and new bore locations that will drive the new benefits of the conditioning orifice plate are summarized in FIGS. 6 and 7.

5. An independent discharge-coefficient algorithm to establish the operational equation for the new conditioning orifice plate design is provided. The design parameters of the conditioning orifice plate are included in the operational equation to predict the value of the discharge coefficient, C, for any pipe inner diameter (ID) and beta within a specified range. During the development of the correction factor (Fc) algorithm, the geometric parameter needed for the 4-bore geometry for different tap-types, $X_{dc}$, was derived and is used in the new discharge coefficient equation downstream tap-term (see FIGS. 8A,8B).

To determine the new discharge coefficient equation, methods to produce the equation for the SOP are used and modified as needed. This equation is used for all pipe sizes, beta values, and tap-types for single-bore orifice plate designs. Certain terms in the equation are modified to account for the new design configuration. Once determined, calibration data samples are used to adjust the equation coefficients to minimize the discharge-coefficient equation uncertainty.

The 4-bore Conditioning Orifice Plate is unique among other types of conditioning orifice plates. The number of bores balances the need for fluid-energy distribution that reduces the effects of upstream disturbances, but still provide bores that can be machined consistently and measured with sufficient precision to predict meter performance. The bore arrangement is symmetrical about the pipe axis to simplify plate orientation for upstream flow fields. Other conditioning orifice plate designs usually include many smaller and/or odd-shaped bores which require calibration as the area for each bore or hole cannot be provided with an adequate tolerance. The design improvements set forth herein create geometric consistency and allow the prediction of the primary design parameter—the discharge coefficient for any pipe size and beta ratio.

Figure 10:
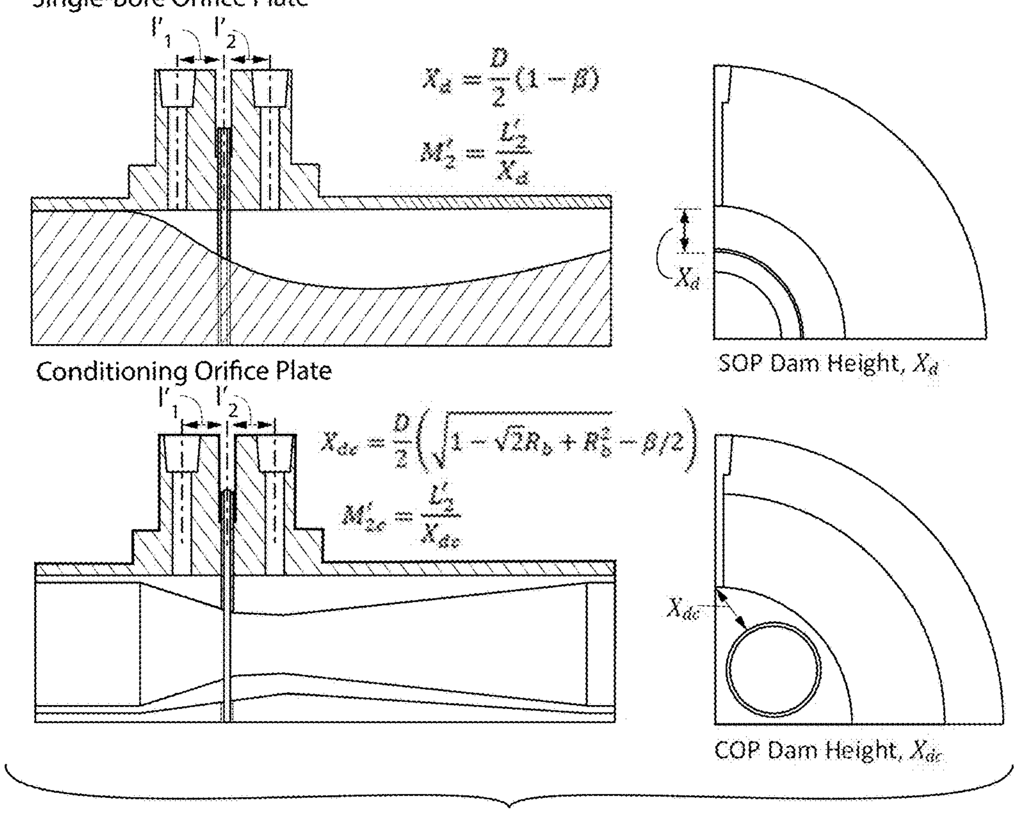
FIG. 10 is a side cross-sectional view tap into a conduit showing dimensions related to tap placement relative to both a single bore and a conditioning orifice plate.

An independent conditioning orifice plate discharge coefficient equation is provided for a new 4-bore orifice plate design configuration. The primary difference between single-bore orifice plate and conditioning orifice plate discharge-coefficient equations is due to the downstream-tap term. This is because the downstream flow fields are different due to the bore arrangements. For a single-bore orifice plate, the primary value used is the independent parameter, $$M_2' = \frac{l_2'}{X_d}$$

where $M'_2$ is the ratio of the downstream tap distance to the orifice plate downstream face, $l'_2$ over the "dam-height", $$X_d = \frac{D}{2}(1 - \beta),$$

and is used to adjust C for different tap types. (see FIG. 10.) The dam-height is the distance from the bore-edge to the pipe wall and is different for the single-bore orifice plate and conditioning orifice plate (see FIG. 4). The equivalent dam-height for the conditioning orifice plate shown in FIGS. 8A,8B, with the design values $$X_{dc} = \frac{D}{2}\left(\left(1 - \sqrt{2}\,R_b + R_b^2\right)^{0.5} - \frac{\beta}{2}\right),$$

and $$X_{ed} = D\left(R_b - \frac{\beta}{2}\right).$$

Figure 9:
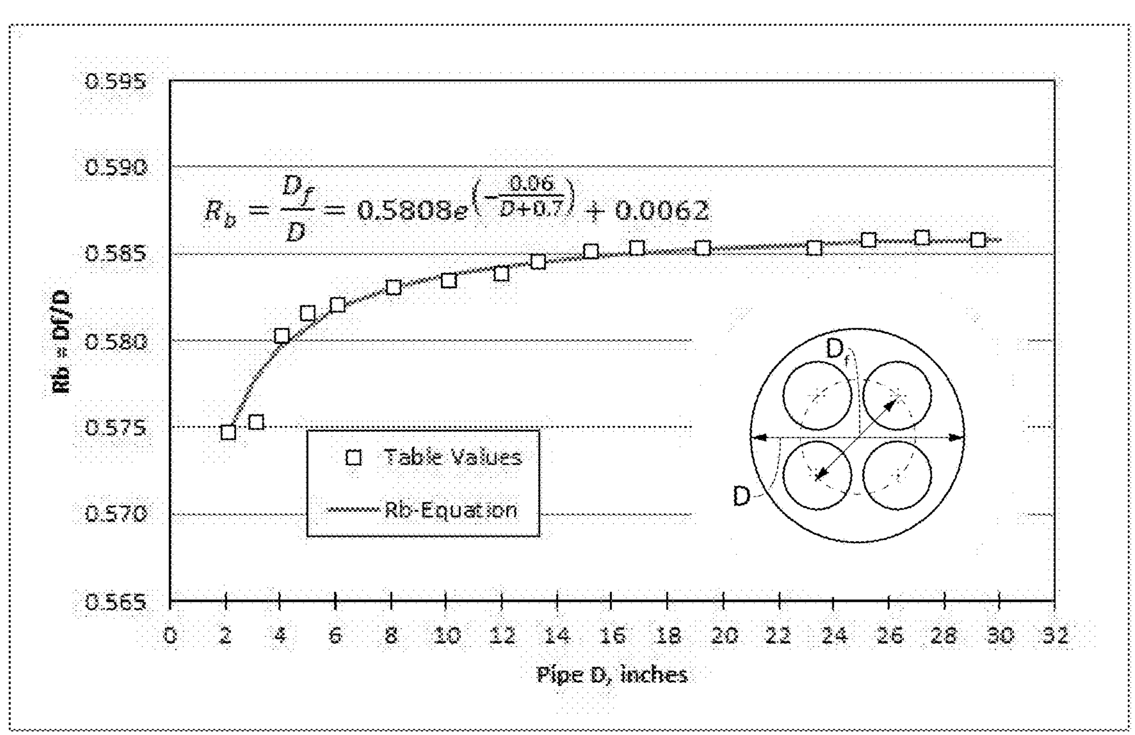
FIG. 9 is a graph which illustrates a relationship between pipe diameter and $R_b$.

Together with the value of $R_b$ shown in FIG. 9, and the tap distance, the independent downstream-tap parameter $$M_{2c}' = \frac{l_2'}{X_{dc}}$$

is determined (the added subscript "c" denoting values for the conditioning orifice plate). These parameters are shown graphically in FIG. 10 and take into account the effects of bore size and bore location to adjust the discharge coefficient for downstream tap position.

The Conditioning Orifice Plate design improvement provides a higher performance for the user, allows the option for an uncalibrated orifice plate at an acceptable uncertainty for all product configurations and facilitates new uses for conditioning orifice plates. Currently, the 4 bore Conditioning Orifice Plate (COP) relies on the Single-bore Orifice Plate (SOP) discharge coefficient equation, adjusted by means of an empirically derived calibration factor based on line size and beta ratio. This factor is not known for all possible configurations, and consequently the ability to predict the calibration factor is limited to a discrete set of geometries for which the adjustment factor has been evaluated in a laboratory setting. The current design uses the same 4-bore locations for all pipe schedules, which results in inconsistent geometry. This design improvement provides a consistent geometry for all pipe schedules and an equation to predict the value of the discharge coefficient within a required uncertainty that is independent and specific to the 4-bore conditioning orifice plate. Special conditioning orifice plates made using the new design do not require calibration, as the discharge coefficient can be predicted for all configurations.

Definition of Terms

| Name | Symbol | Description |
|---|---|---|
| Beta | β | Ratio of orifice equivalent bore to pipe diameter |
| Bore | dc, d | Orifice plate bore diameter, dc -for COP, d for SOP |
| Bore center location diameter | $D_f$ | The diameter that defines the location of the 4-COP bores |
| Calibration factor | Fc | Ratio of C-measured/C-listed or C-measured/C-reference |
| Chamfer, bore bore | α | The angular cut on the downstream side of the orifice |
| COP | — | Acronym for Conditioning Orifice Plate |
| Corner tap | — | Tap that is positioned at the orifice plate face |
| Dam height, COP closest bore | $X_{dc}$ | Perpendicular distance from the downstream tap to the edge |
| Dam height, SOP | $X_d$ | Perpendicular distance from the pipe FORMATTING wall to the orifice bore edge |

-continued

| Name | Symbol | Description |
|---|---|---|
| Downstream tap ratio, COP | $M'_{2c}$ | The ratio $l'_2/X_{dc}$, or tap location to the COP dam height |
| Downstream tap ratio, SOP | $M'_2$ | The ratio $l'_2/X_d$, or tap location to the SOP dam height |
| Diameter, pipe | D | The measured or listed inside diameter of the pipe |
| Discharge coefficient | C | Factor to adjust the Bernoulli equation for DP-flow devices |
| Downstream tap | — | Tap to measure the downstream pressure for an orifice plate |
| Edge, bore | — | Sharp inlet edge and geometry of the orifice bore |
| Equivalent bore | $d_{eq}$ | Bore diameter for equivalent total bore area, 2dc for the COP |
| Flange tap | — | Tap that is in the orifice flange and is 1"(25 mm) from the face |
| Distance to upstream tap | $l_1$ | Distance from upstream orifice face to the center of the tap |
| Distance to downstream tap | $l'_2$ | Distance from downstream orifice face to the center of the tap |
| $F_c$ algorithm | $F_c$(alg) | The value of Fc calculated from an equation for an uncalibrated COP |
| Non-dim upstream tap distance | $L_1$ | The ratio $l_1/D$ |
| Non-dim downstream tap distance | $L'_2$ | The ratio $l'_2/D$ |
| Pipe Schedule | — | Number related to pipe dimensions for a listed pipe size |
| Radius Taps | — | Taps placed at 1D upstream and 0.5D downstream of plate |
| Ratio of bore location to pipe diameter | $R_b$ | Ratio $D_f/D$ used in the COP C-equation and $F_c$ algorithm |
| SOP discharge coef equation | — | Equation to calculate C from β, D, $Re_D$, $L_1$, $L_2$ for the SOP |
| Reynolds number, pipe | $Re_D$ | Ratio of dynamic to viscous fluid forces using D for ref-length |
| SOP | — | Acronym for Single-bore Orifice Plate |
| Tap | — | A small opening in the pipe wall to measure the local pressure |
| True Beta | βTrue | Beta using the true equivalent orifice bore and pipe diameter |
| Upstream tap | — | Tap to measure the upstream pressure for an orifice plate |

The COP discharge coefficient equation has been derived by leveraging the form and methods used for the latest SOP equation. This equation utilizes several sets of terms or elements that are added to obtain the value of C. The terms are classified by the dominant independent-parameters and the proposed forms for each term are:

a. The C-Inf or Beta-Term 1 that contains only a constant and elements that include beta and is given by:

$$C_{inf} = A_1 + A_2\beta^2 - A_3\beta^8$$

b. The slope or Reynolds Number-Term 2 that contributes to the increase in C as the Reynolds number decreases and drops to zero when the Reynolds number goes to infinity and is given by:

$$\Delta C_{slope} = B_1\left(10^6\frac{\beta}{Re_D}\right)^{B_2} + (B_3 + B_4A)\beta^{B_5}\left(\frac{10^6}{Re_D}\right)^{B_6},$$

$$A = (B_7\beta/Re_d)^{0.8B_8}$$

c. The upstream tap-Term 3 that contains the relative distance of the upstream tap from the orifice face, $L_1$ (see FIG. 10) and is derived from data taken using various upstream tap positions for the high pressure and the downstream corner tap for the low pressure. This term is zero when a plate uses an upstream corner-tap and is given by:

$$\Delta C_{upstrm} = \left(D_1 + D_2e^{-D_3L_1} - D_4e^{-D_5L_1}\right)(D_6 - D_7A)\left(\frac{\beta^4}{(1-\beta^4)}\right),\ L_1 = \frac{l_1}{D}$$

d. The downstream tap-Term 4 that contains the relative distance from the orifice downstream face to the downstream tap, $L'_2$, and uses the plate geometry "dam height" to calculate the pressure difference between the upstream corner tap and the downstream tap for various tap positions. This term is zero when a plate uses a downstream corner tap and is given by:

$$\Delta C_{dwnstrm} = E_1\left(M'_2 - E_2M'^{E_3}_2\right)\beta^{E_4},\ M'_2 = \frac{2L'_2}{(1-\beta)},\ L'_2 = \frac{l'_2}{D}$$

(the prime denotes the measured distance is from the downstream face of the orifice plate)

e. The small-pipe-Term 5 which was added to account for changes when the pipe size approaches 2-inches (50 mm). This term is given by:

$$\Delta C_{small-pipe} = C_1(C_2 - \beta)(C_3 - D),\ \text{this term} = 0 \text{ for } D > C_3$$

The equation is then: C=Term 1+Term 2+Term 3+Term 4+Term 5. Terms may be negative or positive or change of sign as the dependent parameters change over the application range.

The terms have bounds and corollaries that are applied. These are:

a. The slope term (Term 2) must go to zero as $Re_D$ goes to infinity.

b. The tap-Terms 3 and 4 must go to zero when $L_1$ and $L_2$ are zero (corner taps)

c. The Upstream tap-Term 3 has a small dependence on $Re_D$ and beta and can be fitted against $L_1$. This is beneficial in that data only need be taken for a few pipe sizes and beta values to determine the proper equation form and best-fit for this term Equation Terms—Order of Evaluation:

a. Corner-Tap, Terms 1 and 2: In this case, the values for Terms 3 and 4 are zero, and for pipe sizes>$C_3$, there is no Term 5. The C-Inf, and Slope terms can now be determined. The coefficients in these equations are adjusted to minimize the uncertainty of the equation to the corner-tap orifice plate data.

b. Flange and Radius-Taps, Term 3: For the flange and radius taps, it is desirable to have data that relates the change in the discharge coefficient to the value of $L_1$. In this case, the differential pressure for both the corner taps and for the upstream tap at various locations and the downstream corner tap are taken. The resulting discharge coefficients are subtracted to provide the "ΔC", or the value of the Upstream tap term: ΔC (Upstream)=C (Upstream Flange–Tap)–C(Corner–Tap). The value of ΔC is plotted against $L_1$ and the Term 3 equation form determined.

c. Flange and Radius-Taps, Term 4: Data is taken using the differential-pressure across both the upstream and downstream flange or radius-taps and from the upstream corner-tap and downstream flange or radius-taps. It is also possible to determine the value by using the calculated value for Terms 1, 2 and 3. The value of the downstream tap term is then given by:

$$\Delta C(\text{Downstream}) = C(\text{Flange–Taps or Radial–Taps}) - C(\text{Upstream Corner–Tap, Downstream Flange or Radius Tap}),$$

or $$\Delta C(\text{Downstream}) = C(\text{Flange–Taps or Radial–Taps}) - [C(\text{Corner–Taps}) - \Delta C(\text{Upstream})]$$

d. Small-Pipe Term 5: This term changes the value of the discharge coefficient for pipe sizes below a given value. The uncertainty of the discharge coefficient equation for pipe sizes below this value are minimized by adjusting coefficients Next, these methods are applied to the new COP configuration. The terms for determining the discharge coefficient for the new COP design are as follows:

i. $C_{inf} = 0.5982 + 0.018\beta^2 - 0.2\beta^8$ ii. $\Delta C_{slope} = 0.0002\left(10^6\frac{\beta}{Re_D}\right)^{0.7} + \left(0.007\left(100000\frac{\beta}{Re_D}\right)^{0.2}\right)\beta^{3.5}\left(\frac{10^6}{Re_D}\right)^{0.2}$ iii. $\Delta C_{upstrm} =$ $$\left(0.095 + 0.042e^{-7L_1} - 0.137e^{-5L_1}\right)\left(1 - 0.011\left(100000\frac{\beta}{Re_D}\right)^{0.8}\right)\left(\frac{\beta^4}{(1-\beta^4)}\right)$$

iv. Corner and Flange–Tap Plates:

$$\Delta C_{dwnstrm} = M_{2c}'^{0.1}\left(2.15e^{-.0022/\beta^{4.5}} - 1.985\right)\left(\frac{\beta^4}{1-\beta^4}\right)(M'_{2c} - 1)^2 - 0.00038M_{2c}'^{0.35}\left(e^{6.6\beta} - 16\right)$$

$$\text{Where: } M'_{2c} = \frac{L'_2}{X_{dc}} = \frac{2L'_2}{\left(\sqrt{1 - \sqrt{2}R_b + R_b^2} - \beta/2\right)}$$

Radius Tap Plates:

$$\Delta C_{dwnstrm} = 0.05(N'_{2c} - 1.45)^2 - 0.007, \text{ Where: } N'_{2c} = \frac{l'_2}{X_{ed}} = \frac{0.5}{(R_b - \beta/2)}$$

v. Corner and Flange–Tap Plates:

$$\Delta C_{small-pipe} = 0.09(0.75 - \beta)(2.3 - D), \text{ for } D \leq 2.3$$

Radius Tap Plates:

$$\Delta C_{small-pipe} = 0.045(0.70 - \beta)(2.8 - D), \text{ for } D \leq 2.8$$

Figure 11:
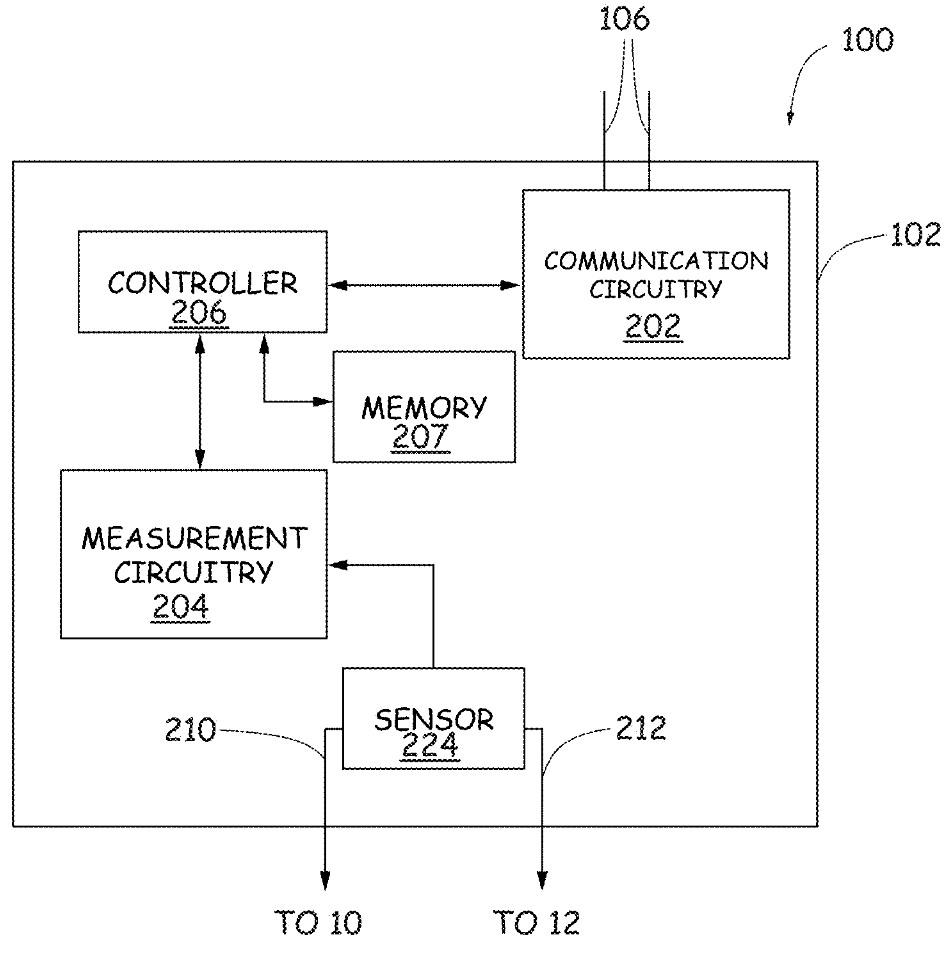
FIG. 11 is a simplified block diagram of a process variable transmitter configured to measure flow based upon a differential pressure created by the orifice plate of the present invention.

FIG. 11 illustrates components of an exemplary embodiment of process variable transmitter 20 for determining flow rate using the new plate design. As shown in the system block diagram of FIG. 11, process variable transmitter 20 includes a differential pressure sensor 224 and other components/circuitry (not shown in FIG. 1) that are configured to receive a process variable and provide a transmitter output on process control loop 106. As discussed, in exemplary embodiments, process variable transmitter 102 is a differential pressure or multivariable transmitter.

The transmitter is couplable to a process control loop such as loop 106 and is adapted to communicate a process variable output, for example related to a differential pressure of fluid flow within the process pipe or conduit 8. In other embodiments, the process variable output is related to multiple variables, such as pressure and temperature. Transmitter 20 includes loop communication circuitry 202, pressure sensor 224, measurement circuitry 204, and controller 206.

Loop communication circuitry 202 is couplable to the process control loop 106 and is adapted to communicate with a remote location such as a process control room. Loop communication circuitry 202 can include circuitry for communicating over a wired communication link and/or a wireless communication link. Such communication can be in accordance with any appropriate process industry standard protocol such as the protocols discussed above, including both wired and wireless protocols.

Pressure sensor 224 includes first and second ports 210, 212 which are coupled to conduits 14 and 16, respectively, on the upstream and downstream sides of orifice plate 2 for coupling to ports 10,12. Coupling of pressure sensor 224 may include coupling through isolation diaphragms and other pressure conveying apparatus and configurations. Sensor 224 can be any device that has an electrical characteristic that changes in response to changes in applied pressure. For example, sensor 224 can be a capacitive pressure sensor, the capacitance of which changes in response to the differential pressure applied between ports 210 and 212.

Measurement circuitry 204 is coupled to sensor 224 and is configured to provide a sensor output related at least to differential pressure between ports 210 and 212. Measurement circuitry 204 can be any electronic circuitry that can provide a suitable signal related to differential pressure. For example, measurement circuitry can be an analog-to-digital converter, a capacitance-to-digital converter or any other appropriate circuitry.

Controller 206 is coupled to measurement circuitry 204 and loop communication circuitry 202. Controller 206 is adapted to provide a process variable output to loop communication circuitry 202, which output is related to the sensor output provided by measurement circuitry 204. Controller 206 can be a programmable gate array device, a microprocessor, or any other appropriate device or devices. Although loop communication circuitry 202, measurement circuitry 204 and controller 206 have been described with respect to individual modules, it is contemplated that they can be combined, such as on an Application Specific Integrated Circuit (ASIC). In an exemplary embodiment, memory 207 is included and is coupled to controller 206 for storage of computer readable instructions, parameter values, etc. used to configure controller 206 and/or measurement circuitry 204. In one configuration, controller 206 calculates flow rate of process fluid using a discharge coefficient stored in memory 207 determined as set forth herein.

Although the embodiments of the present disclosure have been described with reference to preferred embodiments, workers skilled in the art will recognize that changes may be made in form and detail without departing from the spirit and scope of the present disclosure. With the present invention, a flowmeter is provided which includes an orifice plate geometry which is consistent across different pipe and tap configuration. The flowmeter includes a differential pressure sensor and an orifice plate selected from a plurality of orifice plates, where each of the plurality of orifice plates are configured for use with different pipe sizes and/or tap configurations. All of the plurality of orifice plates have a consistent geometric configuration used to determine a discharge coefficient for a particular pipe size and/or tap configuration.

What is claimed is:

1. A differential pressure fluid flow meter for measuring flow of a fluid through a conduit based upon a differential pressure in the fluid generated by the flow of fluid through an orifice plate element disposed between the connecting flanges of conduit sections of a fluid carrying conduit, comprising:

a differential pressure sensor arranged to sense a differential pressure between an upstream tap and a downstream tap in the conduit, wherein the conduit is selected from a plurality of conduits each having a different interior circumference configured to carry the flow of fluid there through;

a flat orifice plate selected from a plurality of flat orifice plates each configured to be positioned between the upstream and the downstream taps in the conduit, where each of the plurality of orifice plates is sized to couple to one of the plurality of conduits having different interior circumferences;

wherein the plurality of flat orifice plates is configured to be sealed between flanges of the conduit along the interior circumference of the conduit which defines a circular active region of the plurality of flat orifice plates;

four evenly spaced circular orifices in each of the active regions of the plurality of flat orifice plates, the four evenly spaced circular orifices configured to allow the flow of fluid there through and create the differential pressure which is a function of fluid flow rate;

wherein $X_{dc}$ is a distance in a direction perpendicular to an axis of the conduit from the nearest outer circumference of the circular orifices to a projection of a center of the downstream tap on the flat orifice plate;

wherein $X_{ed}$ is a distance between outer circumferences of two opposed circular orifices;

wherein $R_b$ is a ratio of the diameter that locates the centers of the four circular orifices and the interior diameter of the conduit;

wherein $X_{dc}$ and $X_{ed}$ are each a function of $R_b$ for each of the plurality of flat orifice plates; and measurement circuitry configured to determine flow rate of the fluid based upon the sensed differential pressure and a discharge coefficient of the flat orifice plate selected from the plurality of flat orifice plates.

2. The differential pressure fluid flow meter of claim 1 wherein the discharge coefficient is a function of beta (β) which is a ratio of orifice equivalent bore to pipe diameter.

3. The differential pressure fluid flow meter of claim 2 wherein $X_{dc}$ is related to $R_b$ as:

$$X_{dc} = \frac{D}{2}\left(\left(1 - \sqrt{2}R_b + R_b^2\right)^{0.5} - \frac{\beta}{2}\right).$$

4. The differential pressure fluid flow meter of claim 2 wherein $X_{ed}$ is related to $R_b$ as:

$$X_{ed} = D\left(R_b - \frac{\beta}{2}\right).$$

5. The differential pressure fluid flow meter of claim 1 wherein the discharge coefficient is a function of a distance between the upstream tap and the flat orifice plate selected from a plurality of flat orifice plates.

6. The differential pressure fluid flow meter of claim 1 wherein the discharge coefficient is a function of a distance between the downstream tap and the flat orifice plate selected from a plurality of flat orifice plates.

7. The differential pressure fluid flow meter of claim 1 wherein a downstream edge of the four evenly spaced circular orifices is chamfered.

8. The differential pressure fluid flow meter of claim 7 wherein the discharge coefficient is a function of the orifice bore, conduit inside diameter, ratio of bore to conduit diameter (beta), a distance between a tap and the flat orifice plate, and orifice bore center location ($R_b$).

9. The differential pressure fluid flow meter of claim 1 including a memory and wherein information related to the discharge coefficient is stored in the memory.

10. The differential pressure fluid flow meter of claim 1 wherein the discharge coefficient is a function of a ratio between a distance between the downstream tap and the flat orifice plate face, selected from the plurality of flat orifice plates and $X_{dc}$ the distance from the orifice bore edge to the downstream tap center.

11. A method of measuring flow with a differential pressure fluid flow meter for measuring flow of a fluid through a conduit based upon a differential pressure in the fluid generated by the flow of fluid through an orifice plate element disposed between the connecting flanges of conduit sections of a fluid carrying conduit, comprising:

providing a differential pressure sensor arranged to sense a differential pressure between an upstream tap and a downstream tap in the conduit, wherein the conduit is selected from a plurality of conduits each having a different interior circumference configured to carry the flow of fluid there through;

providing a flat orifice plate selected from a plurality of flat orifice plates each configured to be positioned between the upstream and the downstream taps in the conduit, where each of the plurality of orifice plates is sized to couple to one of the plurality of conduits having different interior circumferences;

wherein the plurality of flat orifice plates are configured to be sealed between flanges of the conduit along the interior circumference of the conduit which defines a circular active region of the plurality of flat orifice plates;

forming four evenly spaced circular orifices in each of the active regions of the plurality of flat orifice plates, the four evenly spaced circular orifices configured to allow the flow of fluid there through and create the differential pressure which is a function of fluid flow rate;

configuring $X_{dc}$ which is a distance in a direction perpendicular to an axis of the conduit from the nearest outer circumference of the circular orifices to a projection of a center of the downstream tap on the flat orifice plate;

configuring $X_{ed}$ which is a distance between outer circumferences of two opposed circular orifices;

wherein $R_b$ is a ratio of the diameter that locates the centers of the four circular orifices and the interior diameter of the conduit;

configuring $X_{dc}$ and $X_{ed}$ such that they are each a function of $R_b$ for each of the plurality of flat orifice plates; and determining flow rate of the fluid based upon the sensed differential pressure and a discharge coefficient of the flat orifice plate selected from the plurality of flat orifice plates.

12. The method of claim 11 wherein the discharge coefficient is a function of beta (β) which is a ratio of orifice equivalent bore to pipe diameter.

13. The method of claim 11 wherein $X_{dc}$ is related to D, $R_b$, and beta (β) as:

$$X_{dc} = \frac{D}{2}\left(\left(1 - \sqrt{2}R_b + R_b^2\right)^{0.5} - \frac{\beta}{2}\right).$$

14. The method of claim 13 wherein $X_{ed}$ is related to D, $R_b$, and beta (β) as:

$$X_{ed} = D\left(R_b - \frac{\beta}{2}\right).$$

15. The method of claim 13 wherein the discharge coefficient is a function of a distance between at least one of the upstream tap and downstream and the flat orifice plate selected from a plurality of flat orifice plates.

16. The method of claim 14 wherein the discharge coefficient is a function of the orifice bore, conduit inside diameter, ratio of bore to conduit diameter (beta), tap location distance, and orifice bore center location ($R_b$).

* * * * *